United States Patent [19]

Rothgery et al.

[11] Patent Number: 5,098,597

[45] Date of Patent: Mar. 24, 1992

[54] CONTINUOUS PROCESS FOR THE PRODUCTION OF AZIDE SALTS

[75] Inventors: Eugene F. Rothgery, North Branford; David F. Gavin, Cheshire; Kimberly A. Thomas, New Haven, all of Conn.

[73] Assignee: Olin Corporation, Cheshire, Conn.

[21] Appl. No.: 545,784

[22] Filed: Jun. 29, 1990

[51] Int. Cl.$^5$ .................. C01F 1/00; C01D 13/00; C01B 21/08
[52] U.S. Cl. .................. 252/182.34; 423/410; 558/488
[58] Field of Search .................. 252/182.34; 423/410; 558/488

[56] References Cited

U.S. PATENT DOCUMENTS

| | | | |
|---|---|---|---|
| 1,628,380 | 5/1927 | Wilcoxon et al. | 423/410 |
| 2,166,698 | 7/1939 | Allen | 558/488 |
| 3,768,865 | 10/1973 | Dehn | 423/410 |
| 3,869,542 | 3/1975 | Snead et al. | 423/410 |
| 4,353,843 | 10/1982 | Doumaux et al. | 558/488 |

OTHER PUBLICATIONS

Kuhn et al., *J. Am. Chem. Soc.*, 78, 2719-2722 (1956).
Coffey, ed., *Rodd's Chemistry of Carbon Compounds*, 2nd Ed., vol. I, Part B, pp. 57-60, Elsevier Publ. Co. (1964) London.

*Primary Examiner*—Edward A. Miller
*Attorney, Agent, or Firm*—Dale Lynn Carlson

[57] ABSTRACT

The present invention relates to a continuous process for making an alkali metal azide or an alkaline earth metal azide which comprises the steps of: (a) reacting a first reaction mixture comprising an alkali metal nitrite or alkaline earth metal nitrite, a C1—C3 alkanol, and a high boiling acid in a first reactor to form a gaseous C1-C3 alkyl nitrite, (b) controllably feeding said gaseous C1-C3 alkyl nitrite into a second reactor and reacting in a controlled manner a second reaction mixture comprising said gaseous C1-C3 alkyl nitrite, hydrazine, and an alkali metal hydroxide or alkaline earth metal hydroxide, in the presence of an organic solvent, thereby producing an alkali metal azide or alkaline earth metal azide, and (c) removing said alkali metal azide or alkaline earth metal azide from said second reactor and replenishing said reaction mixture in said second reactor to provide a continuous, controlled process for producing said alkali metal azide or alkaline earth metal azide.

9 Claims, No Drawings

CONTINUOUS PROCESS FOR THE PRODUCTION OF AZIDE SALTS

FIELD OF THE INVENTION

The present invention relates to a process for producing azide salts and, more particularly, alkali metal azides and alkaline earth metal azides.

BACKGROUND OF THE INVENTION

Sodium azide serves as the gas-generating charge in virtually all of the gas generating air-bag systems currently utilized in automotive air-bag systems. Two methods of manufacturing sodium azide are known in the art. The first is the so-called sodamide process which comprises the reaction of liquid sodium with liquid ammonia, followed by the addition of nitrous oxide to give sodium azide and sodium hydroxide. Unfortunately, this process has been plagued by several fires in commercial operation in recent years.

The second known process is the so-called hydrazine-nitrite process. This process comprises the reaction of hydrazine with an alkyl nitrite in the presence of a base such as sodium hydroxide. Typically, the alkyl nitrite is produced by reacting an alkyl alcohol, sulfuric acid and sodium nitrite, and the desired product phase separates and is collected and purified. Unfortunately, the alkyl nitrite of choice is butyl or a higher carbon analogue since the lower alkyl nitrites suffer from a low boiling point (and hence volatility) problem. Moreover, the butyl alcohol and higher carbon alcohol precursors are more expensive than might be desired. In a variation of this process, U.S. Pat. No. 1,628,380 discloses a batch process for making sodium azide utilizing absolute ethyl alcohol; however, this patent notes that "a violent reaction set in and pure white sodium azide is thrown out of solution" (emphasis inserted).

New methods of producing the desired azide salts that are less expensive, and less subject to the fire hazard or other violent reaction described above would be highly desired by the automotive air-bag manufacturing community.

SUMMARY OF THE INVENTION

In one aspect, the present invention relates to a continuous process for making an alkali metal azide or an alkaline earth metal azide which comprises the steps of:
(a) reacting a first reaction mixture comprising an alkali metal nitrite or alkaline earth metal nitrite, a C1–C3 alkanol, and a high boiling acid in a first reactor to form a gaseous C1–C3 alkyl nitrite,
(b) controllably feeding said gaseous C1–C3 alkyl nitrite into a second reactor and reacting in a controlled manner a second reaction mixture comprising said gaseous C1–C3 alkyl nitrite, hydrazine, and an alkali metal hydroxide or alkaline earth metal hydroxide, in the presence of an organic solvent, thereby producing an alkali metal azide or alkaline earth metal azide, and
(c) removing said alkali metal azide or alkaline earth metal azide from said second reactor and replenishing said reaction mixture in said second reactor with hydrazine and alkali metal hydroxide or alkaline earth metal hydroxide to provide a continuous, controlled process for producing said alkali metal azide or alkaline earth metal azide.

This and other aspects will become apparent from a reading of the following detailed description of the invention.

DETAILED DESCRIPTION OF THE INVENTION

It has been surprisingly found in accordance with the present invention that metal azide salts are provided in a continuous process without any significant risk of fire or explosion in carrying out the process, thereby providing unique advantages over prior art processes. The use of two separate reactors provides an important safety feature since the acid from the first reactor is prevented from contacting the second reaction mixture by the use of multiple reactors, thereby avoiding or minimizing the risk of generating hydrazoic acid, an extremely toxic and easily detonatable material.

The process of the present invention is suitable for producing any desired alkali metal azide or alkaline earth metal azide, including, for example, sodium azide, potassium azide, calcium azide, and magnesium azide, although the sodium and potassium salts are preferred and sodium azide is most preferred. The alkali metal nitrite or alkaline earth metal nitrite used in step (a) is suitably selected to correspond in it metal ion to the metal ion desired for the metal azide salt product. Likewise, the hydroxide reactant utilized in step (b) is selected to correspond to the desired azide salt product, and sodium hydroxide is preferred, although potassium hydroxide, calcium hydroxide, magnesium hydroxide, or other alkali metal hydroxide or alkaline earth metal hydroxide, or combination thereof, is utilized as desired.

The high boiling acid used in step (a) of the process of the present invention can be any inorganic acid or an organic acid having a high boiling point. Preferred high boiling acids include sulfuric, phosphoric, sulfonic, and phosphonic acid, and combinations thereof. The most preferred acid is sulfuric acid.

The C1–C3 alkanol employed in step (a) is suitably selected from the group of lower carbon-containing alcohols consisting of methanol, ethanol, 1-propanol, 2-propanol, and combinations thereof. The lower carbon-containing alcohols provide the advantage of reacting to form relatively volatile alkyl nitrites that readily vaporize and can be carried overhead into the second reactor without excessive heating of the reaction mixture in the first reactor.

In carrying out step (a) of the process, it is preferred that a water solvent be employed in order to insure that acid salt formed during the reaction be maintained in solution and not precipitate out thereby possibly impeding the desired reaction of step (a). It is also desired that an excess number of molar equivalents of high boiling acid and of nitrite salt be used relative to the molar amount of C1–C3 alkanol in order to insure complete reaction of the alkanol. Preferably the ratio of molar equivalents of acid:nitrite salt:alkanol ranges between 2:2:1 and 1:1:2, more preferably between 1.2:1.2:1 and 0.9:0.9:1.

It is preferred that the reaction of step (b) be conducted in an organic solvent in order to insure a controlled reaction and ease of separation of the desired azide salt product from the slurry mixture containing the solid product. Advantageously, the organic solvent is a C1–C3 alkanol, most preferably an identical alcohol to that employed in step (a). Preferably the ratio of molar equivalents of alkyl nitrite:hydrazine:metal hydroxide ranges between 2:2:1 and 1:1:2.

The reactions of steps (a) and (b) are preferably carried out at a temperature of between about 20° C. and about 70° C., preferably between about 30° C. and about 50° C., and at atmospheric pressure, although a higher or lower pressure may be utilized if desired.

The following examples are intended to illustrate, but in no way limit the scope of, the present invention. All patents referred to herein are incorporated herein by reference in their entirety.

EXAMPLE 1

Continuous Process for Making Sodium Azide Using Two Reactors with Recycle in the Second Reactor A first reactor is charged with sodium nitrite (106.7 grams, 97% pure, 1.5 moles), ethanol (69 grams, 1.5 moles), and water (150 milliliters). The resulting solution is stirred, and sulfuric acid (73.5 grams, 0.75 mole) mixed with 147 milliliters of water is slowly added. Ethyl nitrite (boiling point=17° C.) was generated from the reaction mixture, and the ethyl nitrite vaporized and exited the reactor through a condenser. The ethyl nitrite is passed via a tube to a second reactor and is fed into the second reactor at a point below the surface of a solution contained therein. The solution in the second reactor is composed of 64% hydrazine (25 grams, 0.5 mole), and sodium hydroxide (20 grams, 0.5 mole) dissolved in ethanol (200 milliliters). As the ethyl nitrite entered the solution contained in the second reactor, a mild exotherm was noted, and the desired sodium azide began to form. Solid sodium azide was continuously removed from the resulting slurry by filtration, and the filtrate was replenished with additional hydrazine solution and solid caustic, and the replenished filtrate was recycled back into the second reactor for contact with fresh ethyl nitrite. Thus, a continuous process was provided for production of sodium azide including recycle of the reactants in the second reactor.

Over a period of about eight hours, an additional 25 grams of hydrazine solution and 20 grams of sodium hydroxide were added to the ethanol-containing filtrate being recycled in the second reactor. As a result of this process, 49 grams of sodium azide were produced, which amounted to a overall yield of this product of 75.4%.

What is claimed is:

1. A continuous process for making an alkali metal azide or an alkaline earth metal azide which comprises the steps of:
   (a) reacting a first reaction mixture comprising an alkali metal nitrite or alkaline earth metal nitrite, a C1-C3 alkanol, and a high boiling acid in a first reactor to form a gaseous C1-C3 alkyl nitrite,
   (b) controllably feeding said gaseous C1-C3 alkyl nitrite into a second reactor and reacting in a controlled manner a second reaction mixture comprising said gaseous C1-C3 alkyl nitrite, hydrazine, and an alkali metal hydroxide or alkaline earth metal hydroxide, in the presence of an organic solvent, thereby producing an alkali metal azide or alkaline earth metal azide, and
   (c) removing said alkali metal azide or alkaline earth metal azide from said second reactor and replenishing said reaction mixture in said second reactor with hydrazine and alkali metal hydroxide or alkaline earth metal hydroxide to provide a continuous, controlled process for producing said alkali metal azide or alkaline earth metal azide.

2. The process of claim 1 wherein said alkali metal azide or alkaline earth metal azide is selected from the group consisting of sodium azide, potassium azide, calcium azide, and magnesium azide, and combinations thereof.

3. The process of claim 1 wherein said high boiling acid is selected from the group consisting of sulfuric, phosphoric, sulfonic, and phosphonic acids, and combinations thereof.

4. The process of claim 1 wherein said C1-C3 alkanol employed in step (a) is suitably selected from the group of lower carbon-containing alcohols consisting of methanol, ethanol, 1-propanol, 2-propanol, and combinations thereof.

5. The process of claim 1 wherein step (a) is carried out in the presence of a water solvent.

6. The process of claim 1 wherein step (a) is carried out using a ratio of molar equivalents of acid: nitrite salt:alkanol of between 2:2:1 and 1:1:2.

7. The process of claim 1 wherein step (a) is carried out using a ratio of molar equivalents of acid: nitrite salt:alkanol of between 1.2:1.2:1 and 0.9:0.9:1.

8. The process of claim 1 wherein the organic solvent employed in step (b) is a C1-C3 alkanol.

9. The process of claim 1 wherein step (b) is carried out using a ratio of molar equivalents of alkyl nitrite:hydrazine:metal hydroxide of between 2:2:1 and 1:1:2.

* * * * *